US008639211B2

(12) United States Patent
Hapsari et al.

(10) Patent No.: US 8,639,211 B2
(45) Date of Patent: Jan. 28, 2014

(54) MOBILE COMMUNICATION METHOD AND RADIO BASE STATION (75) Inventors: Wuri Andarmawanti Hapsari, Yokosuka (JP); Tadashi Uchiyama, Miura (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/133,885

(22) PCT Filed: Feb. 2, 2010

(86) PCT No.: PCT/JP2010/051398
§ 371 (c)(1),
(2), (4) Date: Aug. 11, 2011

(87) PCT Pub. No.: WO2010/087491
PCT Pub. Date: Aug. 5, 2010

(65) Prior Publication Data
US 2011/0300886 A1    Dec. 8, 2011

(30) Foreign Application Priority Data
Feb. 2, 2009 (JP) ................................ P2009-022066

(51) Int. Cl.
*H04M 11/04* (2006.01)
(52) U.S. Cl.
USPC ...................................... 455/404.1; 455/527
(58) Field of Classification Search
USPC .................... 455/404.1, 404.2, 521, 527
See application file for complete search history.

(56) References Cited

U.S. PATENT DOCUMENTS

2003/0174678 A1*  9/2003  Chang et al. ................. 370/335
2010/0233990 A1   9/2010  Kitahara et al.

FOREIGN PATENT DOCUMENTS

JP    2006-054592 A    2/2006
WO    2007/148703 A1   12/2007

OTHER PUBLICATIONS

ETSI TS 136 413 V8.4.0 (Jan. 2009) Technical Specification LTE; Evolved Universal Terrestrial Radio Access (E-UTRA); S1 Application Protocol (S1AP) (3GPP TS 36.413 version 8.4.0 Release 8).*
ETSI TS 100 902 V7.2.0, Digital cellular telecommunications system (Phase 2+), Technical realization of Cell Broadcast Service (CBS).*
3GPP TS 36.413 V10.1.0, Mar. 2011, "3rd Generation Partnership Project; Technical Specification Group Radio Access Network; Evolved Universal Terrestrial Radio Access Network (E-UTRAN); S1 Application Protocol (S1AP) (Release 10)," 256 pages.
International Search Report issued in PCT/JP2010/051398, mailed on May 11, 2010, with translation, 3 pages.
Written Opinion issued in PCT/JP2010/051398, mailed on May 11, 2010, 3 pages.

(Continued)

*Primary Examiner* — Raymond Dean
(74) *Attorney, Agent, or Firm* — Osha Liang LLP (57) ABSTRACT A mobile communication method according to the present invention includes the steps of: (A) transmitting, from a radio base station (eNB) to a plurality of cells designated by a transmission request received from a switching center (MME), broadcast information; and (B) transmitting, from the radio base station (eNB) to the switching center (MME), a transmission response which includes an information element to which the number of cells and identification information of the cells are set, in accordance with the transmission request; wherein, in the step (B), when the broadcast information was not successfully transmitted to all the plurality of cells, the radio base station sets "0" to the number of cells in the information element.

2 Claims, 9 Drawing Sheets (56) References Cited

OTHER PUBLICATIONS

Office Action for Russian Application No. 2011123697/07 dated Aug. 15, 2012, with English translation thereof (10 pages).
Extended European Search Report for European Application No. 10735951.5 dated Mar. 26, 2012 (8 pages).
3GPP TS 36.413 V8.4.0, XP-002670907, "Evolved Universal Terrestrial Radio Access Network (E-UTRAN)"; Release 8, Dec. 2008 (10 pages).

Office Action for Chinese Patent Application No. 201080003658.8, issued Apr. 6, 2012, with English translation thereof (12 pages)
ETSI TS 136 413 V8.4.0 (3GPP TS 36.413 version 8.4.0 Release 8), "Evolved Universal Terrestrial Radion Access (E-UTRA)"; Jan. 2009 (11 pages).
Office Action in corresponding Canadian application No. 2,745,931 dated Jul. 16, 2013 (3 pages).

* cited by examiner

WRITE-REPLACE WARNING REQUEST MESSAGE

This message is sent by the MME to request the start or overwrite the broadcast of a warning message.

Direction: MME →eNB

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Message Identifier | M | | 9.2.1.44 | | YES | reject |
| Serial Number | M | | 9.2.1.45 | | YES | reject |
| Warning Area List | O | | 9.2.1.46 | | YES | ignore |
| Repetition Period | M | | 9.2.1.48 | | YES | reject |
| Number of Broadcasts Requested | M | | 9.2.1.49 | | YES | reject |
| Warning Type | O | | 9.2.1.50 | | YES | ignore |
| Warning Security Information | O | | 9.2.1.51 | | YES | ignore |
| Data Coding Scheme | M | | 9.2.1.52 | | YES | reject |
| Warning Message Contents | M | | 9.2.1.53 | | YES | reject |

FIG. 4

Warning Area List

Warning Area List IE indicates the areas where the warning message needs to be broadcast.

| IE/Group Name | Presence | Range | IE type and Reference | Semantics Description |
|---|---|---|---|---|
| Choice Warning Area | | | | |
| >Cell ID List | | 1 to <maxnoofCellID> | | |
| >>E-CGI | M | | 9.2.1.38 | |
| >TAI List | | 1 to <maxnoofTAIs> | | |
| >>TAI | M | | 9.2.3.16 | |
| >Emergency Area ID List | | 1 to <maxnoofEmergencyAreaID> | | |
| >>Emergency Area ID | M | | 9.2.1.47 | |

| Range bound | Explanation |
|---|---|
| maxnoofCellID | Maximum no. of Cell ID subject for warning message broadcast. Value is 65535 (FFS). |
| maxnoofTAI | Maximum no. of TAI subject for warning message broadcast. Value is 65535 (FFS). |
| maxnoofEmergencyAreaID | Maximum no. of Emergency Area ID subject for warning message broadcast. Value is 65535 (FFS). |

FIG. 5

WRITE-REPLACE WARNING RESPONSE MESSAGE

This message is sent by the eNB to acknowlege the MME on the start or overwrite request of a warning message.

Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Message Identifier | M | | 9.2.1.44 | | YES | reject |
| Serial Number | M | | 9.2.1.45 | | YES | reject |
| Broadcast Completed Area List | O | | 9.2.1.54 | | YES | ignore |
| Cause | O | | | | YES | ignore |
| Criticality Diagnostics | O | | 9.2.1.21 | | YES | ignore |

FIG. 6

Broadcast Completed Area List
Broadcast Completed Area List IE indicates the areas where broadcast was performed successfully.

| IE/Group Name | Presence | Range | IE type and Reference | Semantics Description |
|---|---|---|---|---|
| Choice Broadcast Completed Area | | | | |
| >Cell ID Broadcast | | 0 to <maxnoofCellID> | | |
| >>E-CGI | M | | 9.2.1.38 | |
| >TAI Broadcast | | 0 to <maxnoofTAIs> | | |
| >>TAI | M | | 9.2.3.16 | |
| >>Completed Cell in TAI List | | 0 to <maxnoofCellIDinTA> | | |
| >>>E-CGI | M | | | |
| >Emergency Area ID Broadcast | | 0 to <maxnoofEmergencyAreaID> | | |
| >>Emergency Area ID | M | | 9.2.1.47 | |
| >>Completed Cell in Emergency Area ID List | | 0 to <maxnoofCellinEA> | | |
| >>>E-CGI | M | | | |

| Range bound | Explanation |
|---|---|
| maxnoofCellID | Maximum no. of Cell ID subject for warning message broadcast. Value is 65535 (FFS). |
| maxnoofTAI | Maximum no. of TAI subject for warning message broadcast. Value is 65535 (FFS). |
| maxnoofEmergencyAreaID | Maximum no. of Emergency Area ID subject for warning message broadcast. Value is 65535 (FFS). |
| maxnoofCellIDinTA | Maximum no. of Cell ID within a TAI. Value is 65535 (FFS). |
| maxnoofCellIDinEA | Maximum no. of Cell ID within an Emergency Area. Value is 65535 (FFS). |

WRITE-REPLACE WARNING RESPONSE MESSAGE

This message is sent by the eNB to acknowlege the MME on the start or overwrite request of a warning message.

Direction: eNB →MME

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Message Identifier | M | | 9.2.1.44 | | YES | reject |
| Serial Number | M | | 9.2.1.45 | | YES | reject |
| Broadcast Completed Area List | O | | 9.2.1.54 | | YES | ignore |
| Criticality Diagnostics | O | | 9.2.1.21 | | YES | ignore |

→ NOT TRANSMITTED (Broadcast Completed Area List, Criticality Diagnostics)

FIG. 10

WRITE-REPLACE WARNING FAILURE MESSAGE

Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Message Identifier | M | | 9.2.1.44 | | YES | reject |
| Serial Number | M | | 9.2.1.45 | | YES | reject |
| Criticality Diagnostics | O | | 9.2.1.21 | | YES | ignore |

MOBILE COMMUNICATION METHOD AND RADIO BASE STATION

TECHNICAL FIELD

The present invention relates to a mobile communication method and a radio base station.

BACKGROUND ART

In mobile communication systems standardized in the 3rd Generation Partnership Project (3GPP), a switching center MME is configured to transmit a "WRITE-REPLACE WARNING REQUEST message" to a radio base station eNB via an S1 interface, and the radio base station eNB is configured to transmit emergency information, such as Earthquake and Tsunami Warning System (ETWS) information, to a plurality of cells in a specified area.

SUMMARY OF THE INVENTION

Problems to be Solved by the Invention

However, there has been a problem in the related art mobile communication systems that, when the emergency information was not successfully transmitted to any of the cells designated by the switching center MME, the radio base station eNB cannot report the unsuccessful transmission to the switching center MME.

The present invention is made in view of the above-described problem and an object thereof is to provide a mobile communication method and a radio base station in which the radio base station can report, to the switching center, an unsuccessful transmission of the emergency information to any of the cells designated by the switching center MME.

Means for Solving the Problem

A first aspect of the present invention is summarized as a mobile communication method including the steps of: (A) transmitting, from a radio base station to a plurality of cells designated by a transmission request received from a switching center, broadcast information; (B) transmitting, from the radio base station to the switching center, a transmission response which includes an information element to which the number of cells and identification information of the cells are set, in accordance with the transmission request; and (C) receiving, at the switching center, the transmission response; wherein, in the step (B), when the broadcast information was successfully transmitted to at least one of a plurality of cells, the radio base station sets the number of cells to which the broadcast information was successfully transmitted and identification information of the cells, as the number of cells and the identification information of the cells in the information element; in the step (B), when the broadcast information was not successfully transmitted to any of the plurality of cells, the radio base station sets "0" to the number of cells in the information element; and in the step (C), the switching center detects occurrence of a failure in the radio base station, when "0" is set to the number of cells in the information element included in the transmission response.

A second aspect of the present invention is summarized as a mobile communication method including the steps of: (A) transmitting, from a radio base station to a plurality of cells designated by a transmission request received from a switching center, broadcast information; (B) transmitting, from the radio base station to the switching center, a transmission response which includes an information element to which the number of cells and identification information of the cells are set, in accordance with the transmission request; and (C) receiving, at the switching center, the transmission response; wherein, in the step (B), when the broadcast information was successfully transmitted to at least one of the plurality of cells, the radio base station sets the number of cells to which the broadcast information was successfully transmitted and the identification information, as the number of cells and the identification information of the cells in the information element; in the step (B), when the broadcast information was not successfully transmitted to any of the plurality of cells, the radio base station transmits the transmission response which includes no information element; and in the step (C), when the switching center receives the transmission response which includes no information element, the switching center detects occurrence of a failure in the radio base station.

A third aspect of the present invention is summarized as a mobile communication method including the steps of: (A) transmitting, from a radio base station to a plurality of cells designated by a transmission request received from a switching center, broadcast information; (B) transmitting, from the radio base station to a transmission response in accordance with the "transmission request; and (C) receiving, at the switching center, the transmission response; wherein, in the step (B), when the broadcast information was successfully transmitted to at least one of the plurality of cells, the radio base station transmits a first transmission response which includes an information element to which the number of cells to which the broadcast information was transmitted successfully and the identification information of the cells are set; in the step (B), when the broadcast information was not successfully transmitted to any of the plurality of cells, the radio base station transmits a second transmission response which includes no information element; and in the step (C), when the switching center receives the second transmission response, the switching center detects occurrence of a failure in the radio base station.

A fourth aspect of the present invention is summarized as a radio base station eNB which includes: a broadcast information transmitting unit configured to transmit broadcast information to a plurality of cells designated by a transmission request received from a switching center; and a transmission response transmitting unit configured to transmit, to the switching center, a transmission response which includes an information element to which the number of cells and identification information of the cells are set, in accordance with the transmission request; wherein, when the broadcast information was successfully transmitted to at least one of the plurality of cells, the transmission response transmitting unit is configured to set the number of cells to which the broadcast information was successfully transmitted and the identification information of the cells, as the number of cells and the identification information of the cells in the information element; and when the broadcast information was not successfully transmitted to any of the plurality of cells, the transmission response transmitting unit is configured to set "0" to the number of cells in the information.

A fifth aspect of the present invention is summarized as a radio base station which includes: a broadcast information transmitting unit configured to transmit broadcast information to a plurality of cells designated by a transmission request received from a switching center; and a transmission response transmitting unit configured to transmit, to the switching center, a transmission response which includes an information element to which the number of cells and identification information of the cells are set, in accordance with the transmission request; wherein: when the broadcast information was successfully transmitted to at least one of the plurality of cells, the transmission response transmitting unit is configured to set the number of cells to which the broadcast information was successfully transmitted and the identification information of the cells, as the number of cells and the identification information of the in the information element; and when the broadcast information was not successfully transmitted to any of the plurality of cells, the transmission response transmitting unit is configured to transmit the transmission response which includes no information element.

A sixth aspect of the present embodiment is summarized as a radio base station which includes: a broadcast information transmitting unit configured to transmit broadcast information to a plurality of cells designated by a transmission request received from a switching center; and a transmission response transmitting unit configured to transmit a transmission response to the switching center in accordance with the transmission request; wherein, when the broadcast information was successfully transmitted to at least one of the plurality of cells, the transmission response transmitting unit is configured to transmit a first transmission response which includes an information element to which the number of cells to which the broadcast information was transmitted successfully and the identification information of the cells are set; and when the broadcast information was not successfully transmitted to any of the plurality of cells, the transmission response transmitting unit is configured to transmit a second transmission response which includes no information element.

Effect of the Invention

As described above, according to the present invention, a mobile communication method and a radio base station in which the radio base station can report, to the switching center, an unsuccessful transmission of the emergency information to any of the cells designated by the switching center MME can be provided.

BEST MODES FOR CARRYING OUT THE INVENTION (Configuration of Mobile Communication System According to the First Embodiment of the Present Invention)

With reference to FIGS. 1 to 6, a configuration of a mobile communication system according to a first embodiment of the present invention will be illustrated.

A mobile communication system of the LTE scheme will be described herein as an exemplary mobile communication system according to the present embodiment; however, other schemes may be used in the mobile communication system according to the present embodiment.

Figure 1:
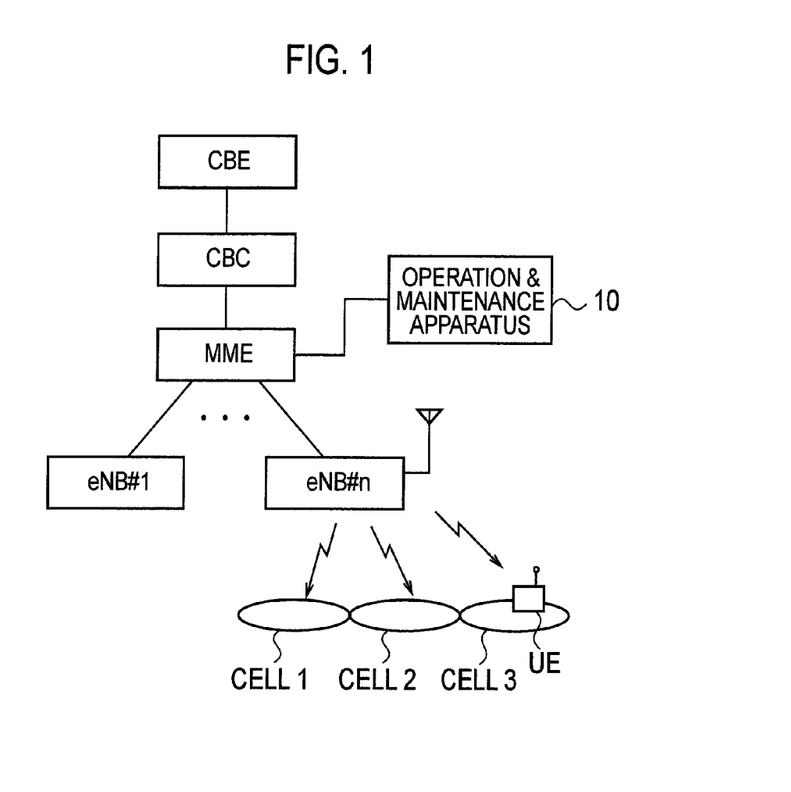
FIG. 1 is a diagram of an entire configuration of a mobile communication system according to a first embodiment of the present invention.

As illustrated in FIG. 1, the mobile communication system according to the present embodiment includes a CBE (Cell Broadcast Entity), a CBC (Cell Broadcast Center), a switching center MME, an operation & maintenance apparatus 10 and radio base stations eNBs #1 to #n.

In the mobile communication system according to the present embodiment, the radio base stations eNBs #1 to #n are configured to transmit broadcast information (for example, emergency information, such as ETWS information) to cells #1 to #3, in accordance with a "WRITE-REPLACE WARNING REQUEST message (a transmission request)" received from the switching center MME.

Figure 2:
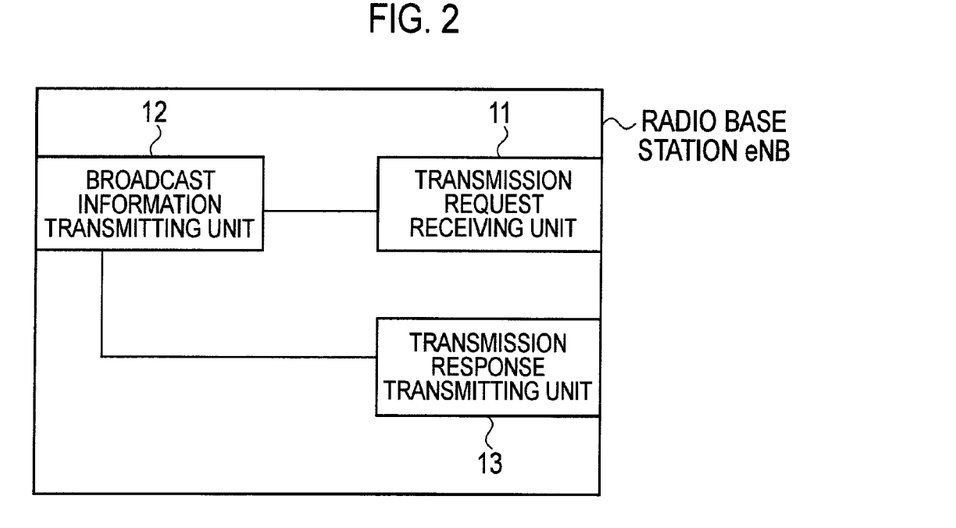
FIG. 2 is a functional block diagram of a radio base station according to the first embodiment of the present invention.

As the radio base stations eNBs #1 to #n are substantially the same in configuration, they will be collectively referred to as a radio base station eNB. As illustrated in FIG. 2, the radio base station eNB includes a transmission request receiving unit 11, a broadcast information transmitting unit 12 and a transmission response transmitting unit 13.

The transmission request receiving unit 11 is configured to receive the "WRITE-REPLACE WARNING REQUEST message" transmitted by the switching center MME.

The broadcast information transmitting unit 12 is configured to transmit the broadcast information to a plurality of cells designated by an information element "Warning Area List" included in the "WRITE-REPLACE WARNING REQUEST message" received by the transmission request receiving unit 11.

Figure 3:
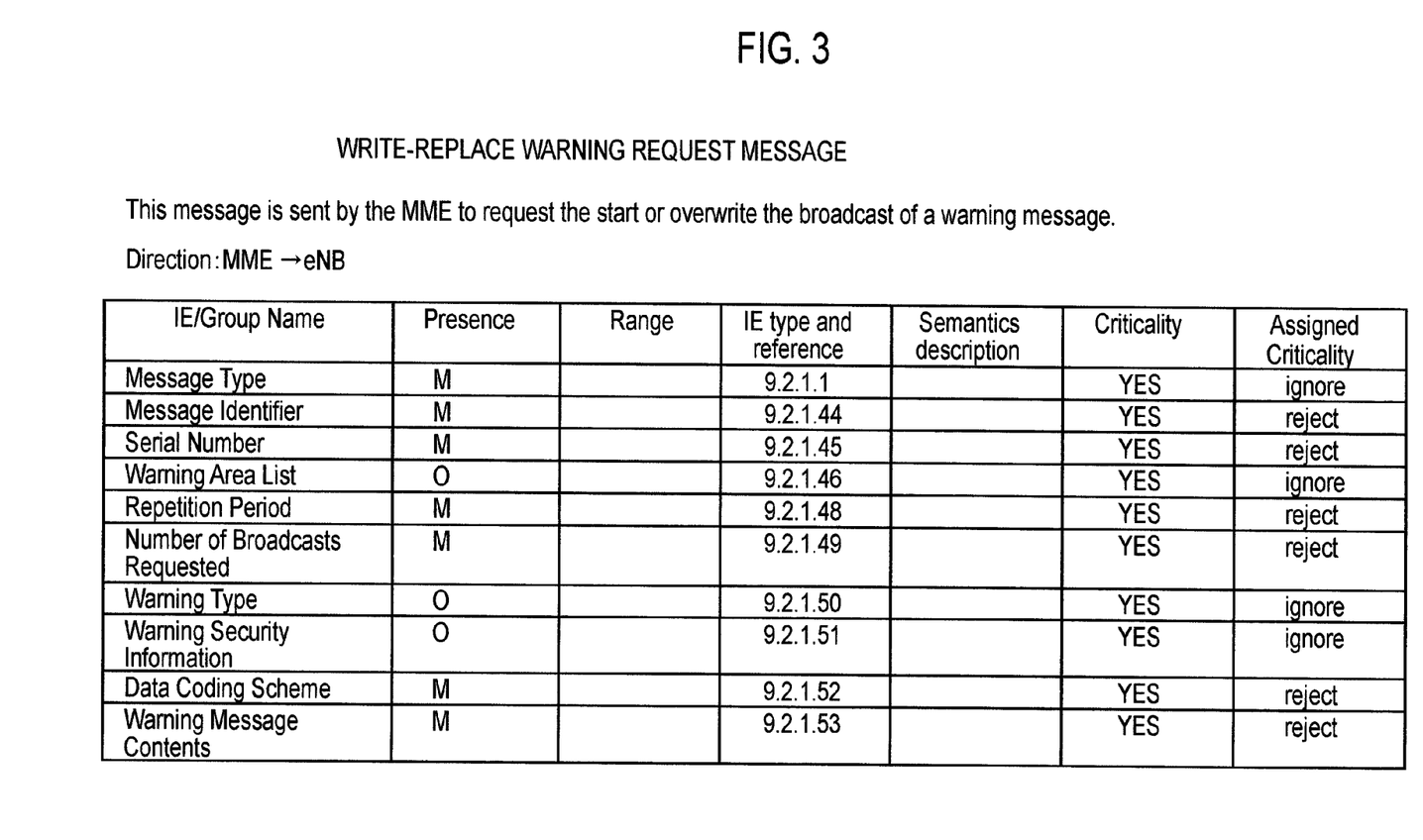
FIG. 3 is a diagram illustrating a "WRITE-REPLACE WARNING REQUEST message" transmitted by a switching center according to the first embodiment of the present invention.

The information element included in the "WRITE-REPLACE WARNING REQUEST message" is illustrated in FIG. 3. Information which can be set to each information element is defined in each section of the "3GPP TS36.413" described in the "IE type and reference" (for example, a "Message Type" is defined in Section 9.2.1.1).

Figure 4:
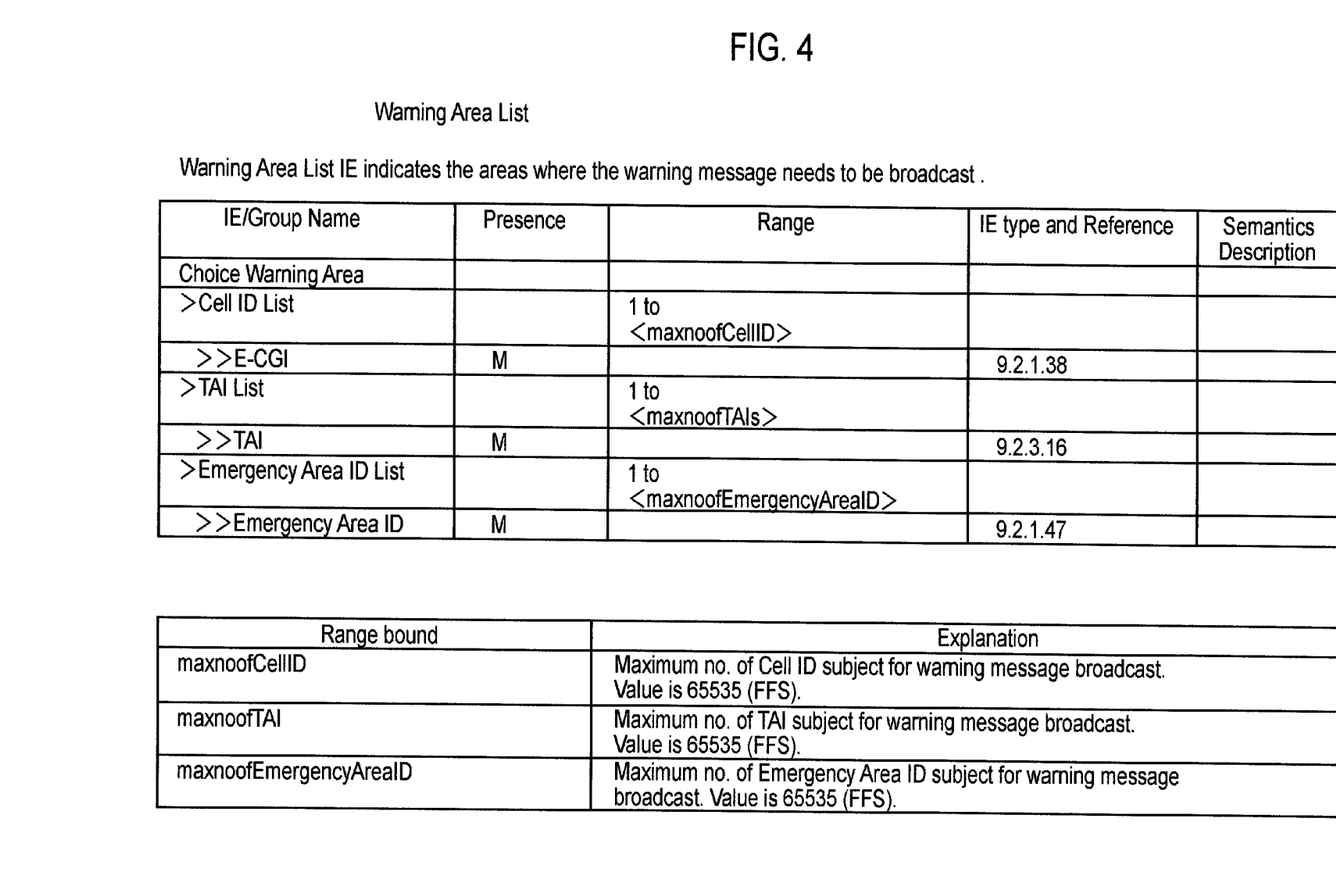
FIG. 4 is a diagram illustrating an information element "Warning Area List" included in the "WRITE-REPLACE WARNING REQUEST message" transmitted by the switching center according to the first embodiment of the present invention.

For example, as illustrated in FIG. 4, a "Cell ID List" representing the number of cells to which the broadcast information is to be transmitted and an "E-CGI (E-UTRAN Cell Global Identifier)" representing identification information (cell ID) of those cells, a "TAI (Tracking Area Identifier) List" representing the number of tracking areas (TAs) which include a plurality of cells to which the broadcast information is to be transmitted and a "TAI" representing the identification information of those tracking areas, or an "Emergency Area ID List" representing the number of emergency areas which include a plurality of cells to which the broadcast information is to be transmitted and an "Emergency Area ID" representing the identification information of those emergency areas can be set to the information element "Warning Area List".

The transmission response transmitting unit 13 is configured to transmit a "WRITE-REPLACE WARNING RESPONSE message (a transmission response)" in accordance with the "WRITE-REPLACE WARNING REQUEST message".

Figure 5:
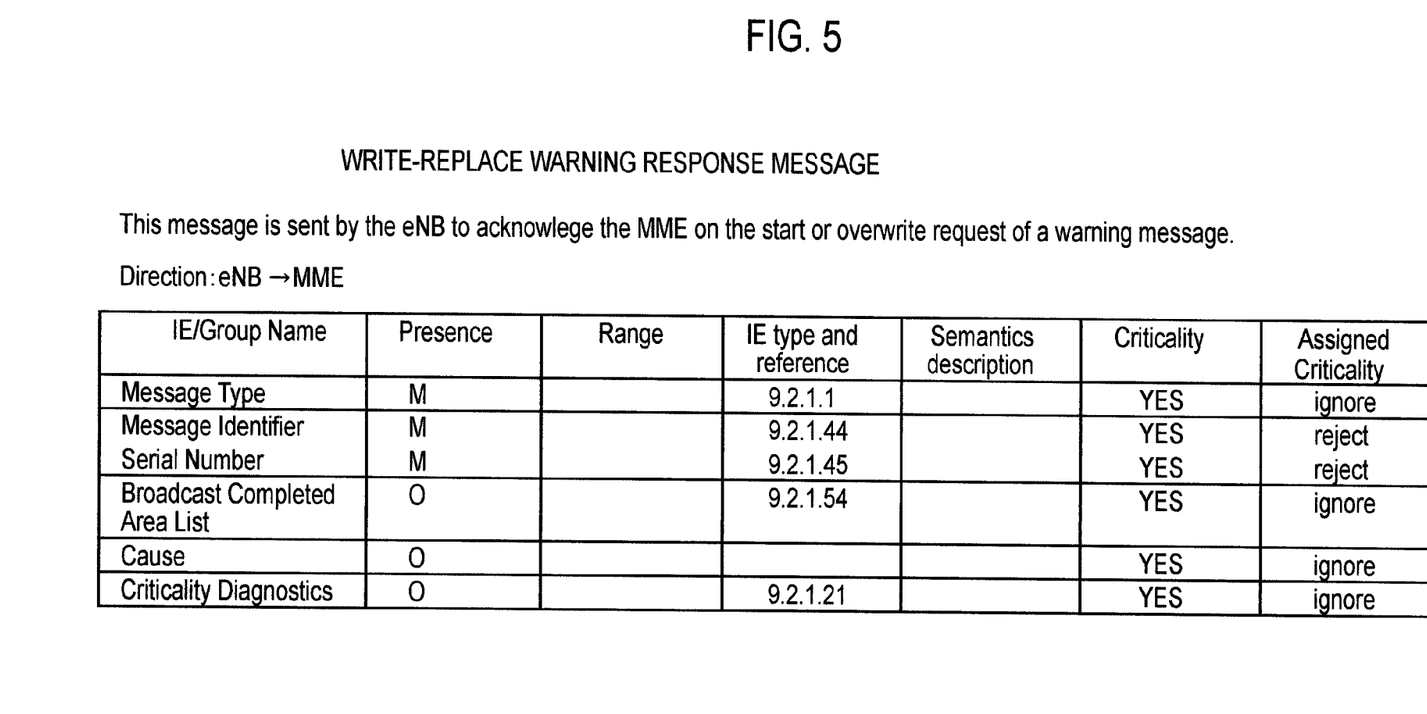
FIG. 5 is a diagram illustrating a "WRITE-REPLACE WARNING RESPONSE message" transmitted by the radio base station according to the first embodiment of the present invention.

Information elements included in the "WRITE-REPLACE WARNING RESPONSE message" are illustrated in FIG. 5. Information which can be set to each information element is defined in each section of the "3GPP TS36.413" described in the "IE type and reference" (for example, a "Message Type" is defined in Section 9.2.1.1).

Figure 6:
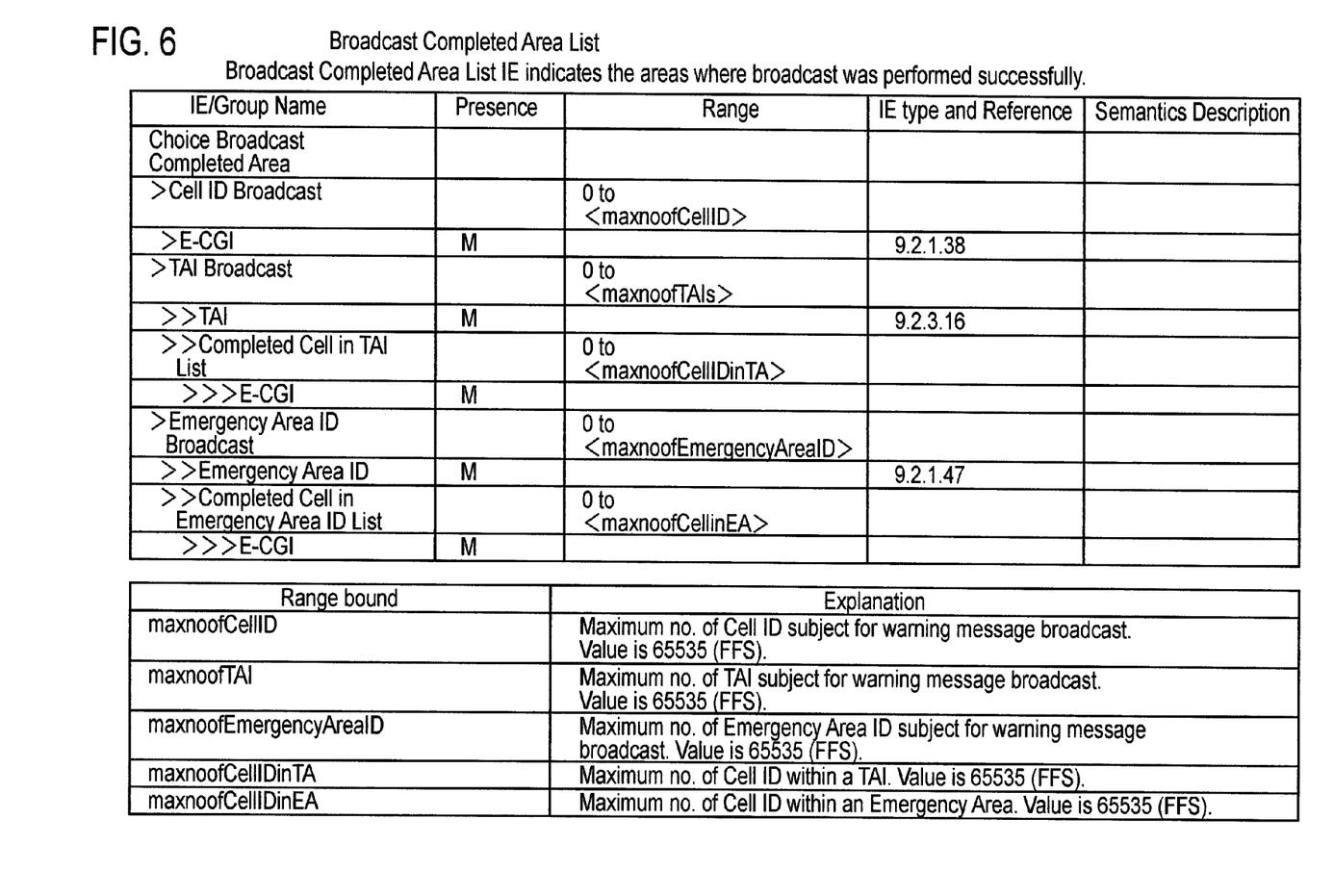
FIG. 6 is a diagram illustrating an information element "Broadcast Completed Area List" included in the "WRITE-REPLACE WARNING RESPONSE message" transmitted by the radio base station according to the first embodiment of the present invention.

For example, as illustrated in FIG. 6, a "Cell ID Broadcast" representing the number of cells to which the broadcast information was successfully transmitted and the "E-CGI" representing the identification information of those cells can be set to the information element "Broadcast Completed Area List".

Alternatively, a "TAI Broadcast" representing the number of tracking areas to which the broadcast information was successfully transmitted, the "TAI" representing the identification information of those tracking areas, a "Completed Cell in TAI List" representing the number of cells included in those tracking areas and the "E-CGI" representing identification information of the cells included in those tracking areas can be set to the information element "Broadcast Completed Area List".

Alternatively, an "Emergency Area ID Broadcast" representing the number of emergency areas to which the broadcast information was successfully transmitted, the "Emergency Area ID" representing the identification information of the emergency areas, a "Completed Cell in Emergency Area ID List" representing the number of cells included in the emergency areas and the "E-CGI" representing the identification information of the cells included in the emergency area can be set to the information element "Broadcast Completed Area List".

Here, when the broadcast information was successfully transmitted to at least one of a plurality of cells, the transmission response transmitting unit 13 is configured to set the number of cells to which the broadcast information was successfully transmitted to the "Cell ID Broadcast" in the information element "Broadcast Completed Area List", and to set the identification information of those cells to the "E-CGI" in the information element "Broadcast Completed Area List".

Alternatively, when the broadcast information was successfully transmitted to at least one of a plurality of cells, the transmission response transmitting unit 13 is configured to set the number of cells to which the broadcast information was successfully transmitted to the "Completed Cell in TAI List" in the information element "Broadcast Completed Area List", and to set the identification information of those cells to the "E-CGI" in the information element "Broadcast Completed Area List".

Alternatively, when the broadcast information was successfully transmitted to at least one of a plurality of cells, the transmission response transmitting unit 13 is configured to set the number of cells to which the broadcast information was successfully transmitted to the "Completed Cell in Emergency Area ID List" in the information element "Broadcast Completed Area List", and to set the identification information of those cells to the "E-CGI" in the information element "Broadcast Completed Area List".

When the broadcast information was not successfully transmitted to any of the plurality of cells, the transmission response transmitting unit 13 is configured to set "0" to the "Cell ID Broadcast", the "Completed Cell in TAI List" or the "Completed Cell in Emergency Area ID List" in the information element "Broadcast Completed Area List".

When the broadcast information was not successfully transmitted to any of the plurality of cells, the transmission response transmitting unit 13 maybe configured to set a "Cause (a cause of a failure)" to the information element "Broadcast Completed Area List".

Figure 7:
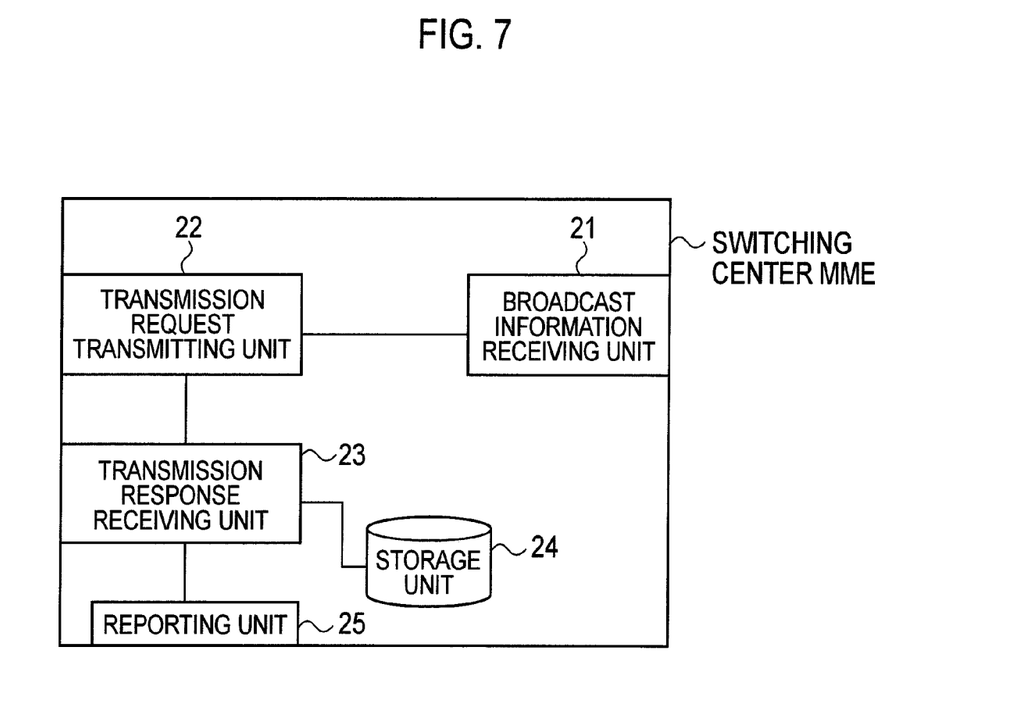
FIG. 7 is a functional block diagram of the switching center according to the first embodiment of the present invention.

As illustrated in FIG. 7, the switching center MME includes a broadcast information receiving unit 21, a transmission request transmitting unit 22, a transmission response receiving unit 23, a storage unit 24 and a reporting unit 25.

The broadcast information receiving unit 21 is configured to receive broadcast information which should be transmitted from the CBC to a specified area (in the present embodiment, cells 1 to 3).

The transmission request transmitting unit 22 is configured to transmit, to the radio base station eNB, the "WRITE-REPLACE WARNING REQUEST message" for requesting a transmission of the broadcast information received by the broadcast information receiving unit 21 to the specified area.

The transmission response receiving unit 23 is configured to receive the "WRITE-REPLACE WARNING RESPONSE message" transmitted by the radio base station eNB.

Here, the transmission response receiving unit 23 is configured to detect occurrence of a failure in the radio base station eNB, when "0" is set to the number of cells in the information element "Broadcast Completed Area List" included in the "WRITE-REPLACE WARNING RESPONSE message" (for example, the "Cell ID Broadcast", the "Completed Cell in TAI List" or the "Completed Cell in Emergency Area ID List").

The transmission response receiving unit 23 may be configured to store the failure in the storage unit 24, or to report the failure to the operation & maintenance apparatus 10 via the reporting unit 25.

The transmission response receiving unit 23 may also be configured to perform a process corresponding to the "Cause" set to the information element "Broadcast Completed Area List" included in the "WRITE-REPLACE WARNING RESPONSE message".

(Operation of the Mobile Communication System According to the First Embodiment of the Present Invention)

Hereafter, with reference to FIG. 8, an operation of the mobile communication system according to the present embodiment will be described.

Figure 8:
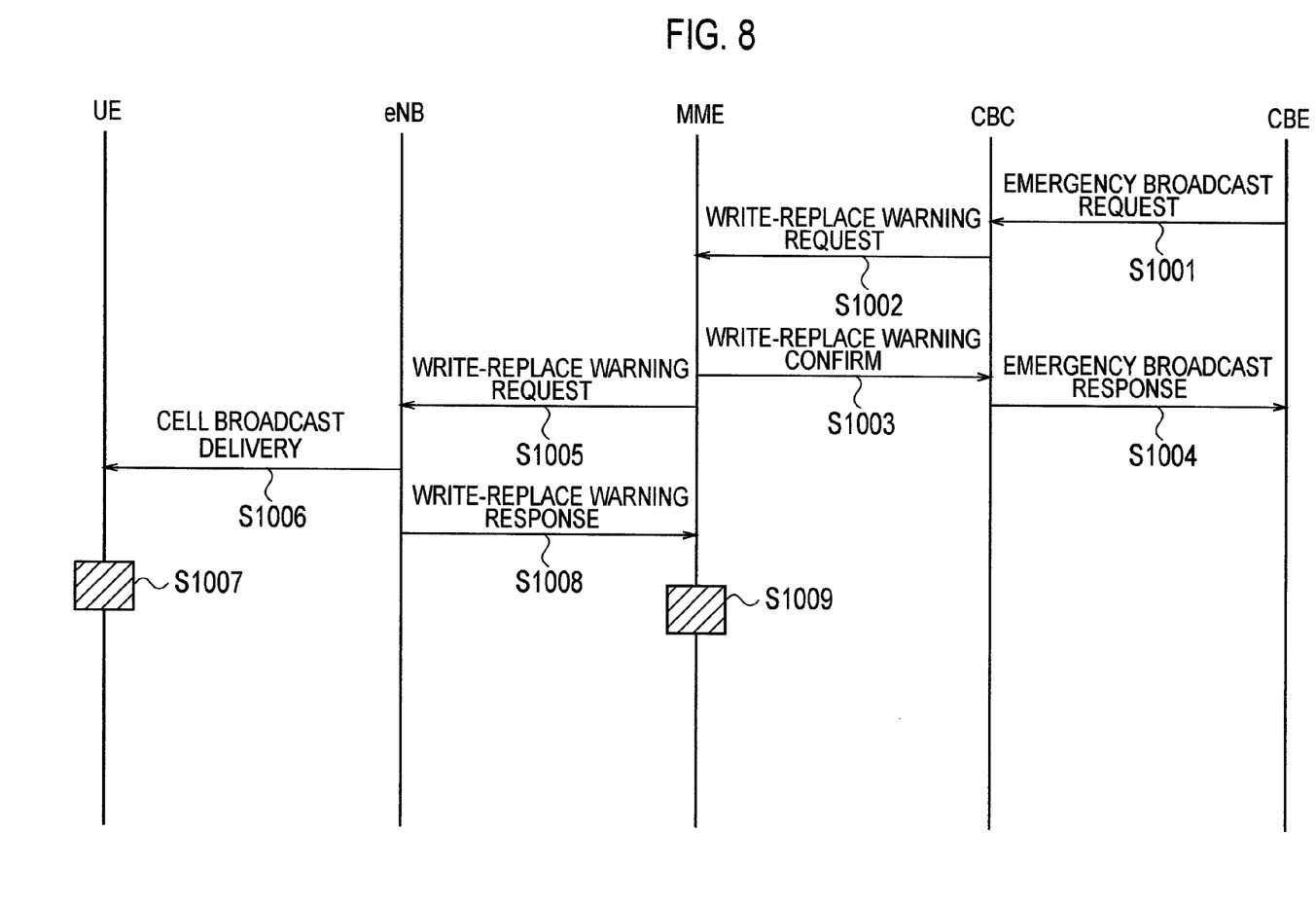
FIG. 8 is a sequence diagram illustrating an operation of the mobile communication system according to the first embodiment of the present invention.

As illustrated in FIG. 8, in step S1001, the CBE transmits, to the CBC, the "EMERGENCY BROADCAST REQUEST message" which includes the emergency information which should be transmitted to the specified area. In step S1002, the CBC transmits, to the switching center MME, the "WRITE-REPLACE WARNING REQUEST message" which includes the emergency information which should be transmitted to the specified area.

In step S1005, the switching center MME transmits, to the radio base station eNB, the "WRITE-REPLACE WARNING REQUEST message" which includes the emergency information which should be transmitted to the specified area. In step S1003, the switching center MME transmits a "WRITE-REPLACE WARNING CONFIRM message" to the CBC without waiting for a reception of the "WRITE-REPLACE WARNING RESPONSE message" transmitted by the radio base station eNB.

In step S1004, the CBC transmits the "EMERGENCY BROADCAST RESPONSE message" to the CBE in accordance with the "WRITE-REPLACE WARNING CONFIRM message".

In step S1006, the radio base station eNB transmits the broadcast information to a plurality of cells designated by the information element "Warning Area List" included in the "WRITE-REPLACE WARNING REQUEST message".

In step S1007, a mobile station UE located in either of the above-described plurality of cells receives and displays the broadcast information.

In step S1008, the radio base station eNB transmits the "WRITE-REPLACE WARNING RESPONSE message" to the switching center MME.

Here, when the broadcast information was successfully transmitted to at least one of the plurality of cells, the radio base station eNB sets the number of the cells to which the broadcast information was successfully transmitted and identification information, as the number of cells (for example, the Cell ID Broadcast) and the identification information of the cells (for example, the E-CGI) in the information element "Broadcast Completed Area List".

When, on the other hand, the broadcast information was not successfully transmitted to any of the plurality of cells, the radio base station eNB sets "0" to the number of cells (for example, the Cell ID Broadcast) in the information element "Broadcast Completed Area List".

In step S1009, the switching center MME receives the "WRITE-REPLACE WARNING RESPONSE message".

Here, the switching center MME detects occurrence of a failure in the radio base station eNB, when "0" is set to the number of cells (for example, the Cell ID Broadcast) in the information element "Broadcast Completed Area List" included in the "WRITE-REPLACE WARNING RESPONSE message".

(Advantageous Effect of the Mobile Communication System According to the First Embodiment of the Present Invention)

According to the mobile communication system according to the first embodiment of the present invention, when the broadcast information was not successfully transmitted to any of the plurality of cells, the radio base station eNB transmits, to the switching center MME, the "WRITE-REPLACE WARNING RESPONSE message" in which "0" is set to the number of cells (for example, the Cell ID Broadcast) in the information element "Broadcast Completed Area List", whereby the radio base station eNB can report, to the switching center MME, the unsuccessful transmission of the emergency information to any of the cells designated by the switching center MME.

(First Modification)

Figure 9:
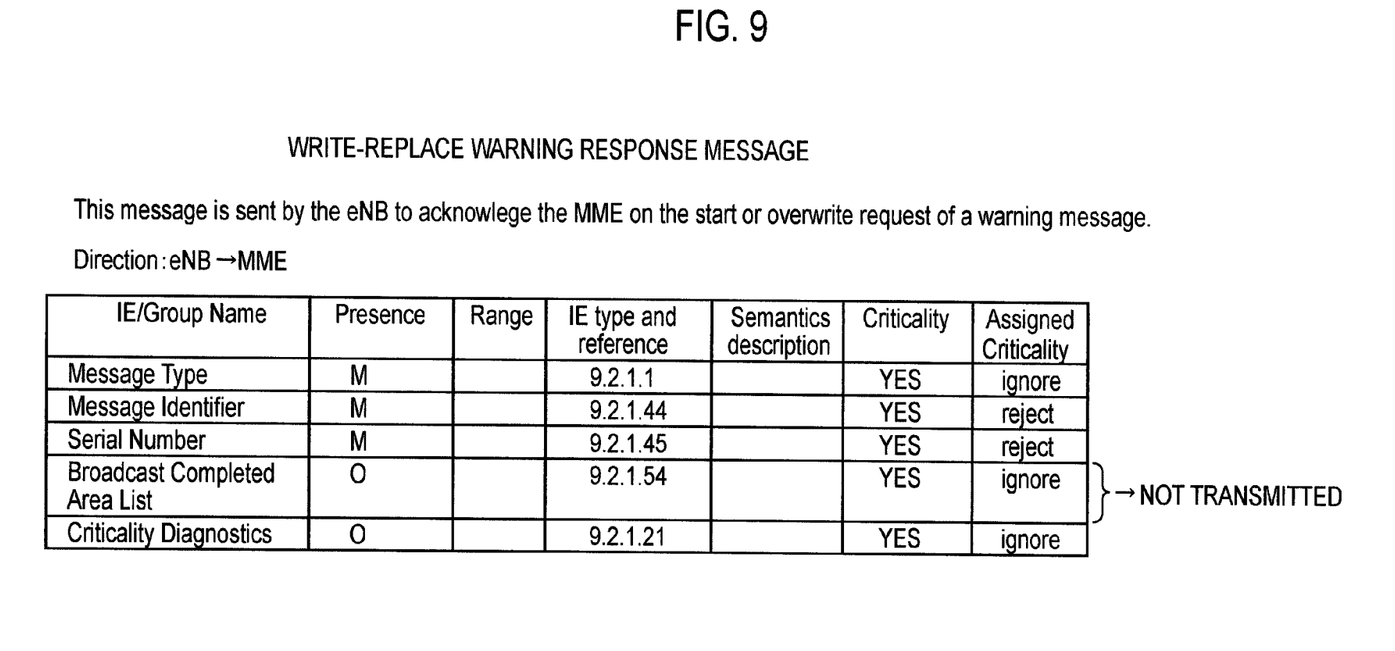
FIG. 9 is a diagram illustrating a "WRITE-REPLACE WARNING RESPONSE message" transmitted by a radio base station according to a first modification.

With reference to FIG. 9, a first modification of the mobile communication system according to the above-described first embodiment will be described. Hereafter, the mobile communication system according to the first modification will be described, focusing on differences from the mobile communication system according to the above-described first embodiment.

The transmission response transmitting unit 13 of the radio base station eNB is configured to transmit a "WRITE-REPLACE WARNING RESPONSE message" which includes no information element "Broadcast Completed Area List", when the broadcast information was not successfully transmitted to any of the plurality of cells designated by the switching center MME, as illustrated in FIG. 9.

The transmission response receiving unit 23 of the switching center MME is configured to detect occurrence of a failure in the radio base station eNB, when it received the "WRITE-REPLACE WARNING RESPONSE message" which includes no information element "Broadcast Completed Area List".

According to the mobile communication system according to the first modification, when the broadcast information was not successfully transmitted to any of the plurality of cells, the radio base station eNB transmits the "WRITE-REPLACE WARNING RESPONSE message" which includes no information element "Broadcast Completed Area List" to the switching center MME, whereby the radio base station eNB can report, to the switching center MME, the unsuccessful transmission of the emergency information to any of the cells designated by the switching center MME.

(Second Modification)

Figure 10:
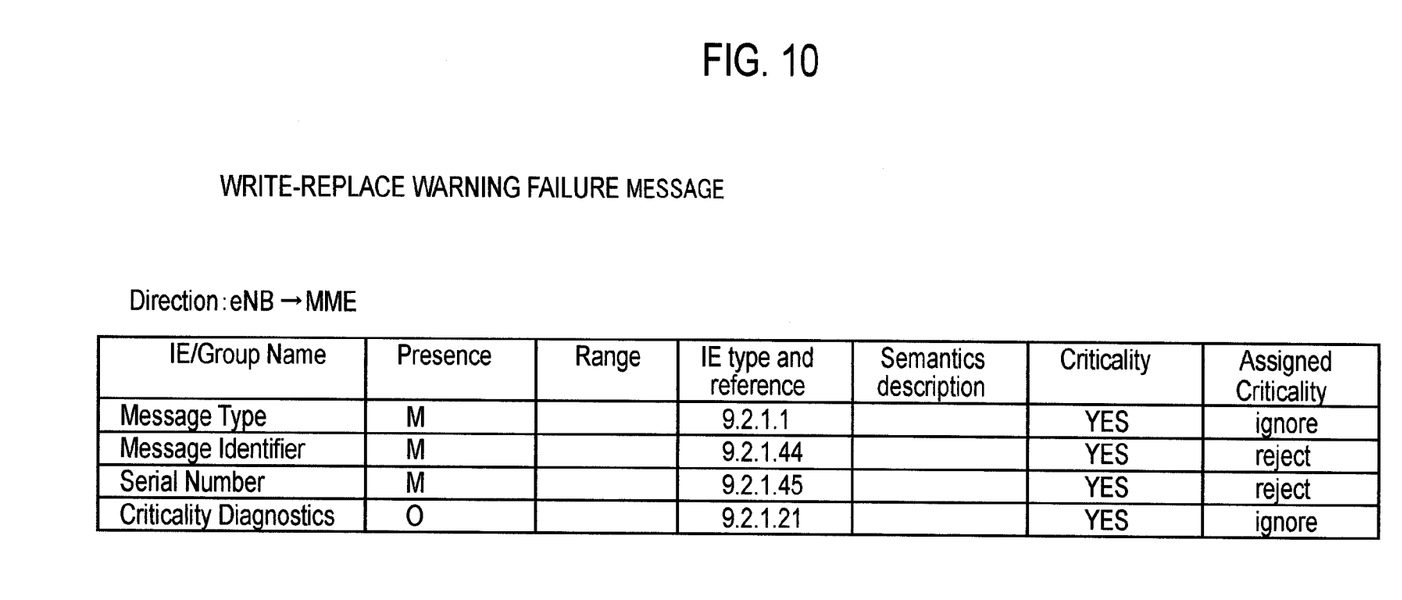
FIG. 10 is a diagram illustrating a "WRITE-REPLACE WARNING FAILURE message" transmitted by a radio base station according to a second modification.

With reference to FIG. 10, a second modification of the mobile communication system according to the above-described first embodiment will be described. Hereafter, the mobile communication system according to the second modification will be described, focusing on differences from the mobile communication system according to the above-described first embodiment.

When the broadcast information was successfully transmitted to at least one of the plurality of cells designated by the switching center MME, the transmission response transmitting unit 13 of the radio base station eNB is configured to transmit a "WRITE-REPLACE WARNING REQUEST message (a first transmission response)" which includes an information element "Broadcast Completed Area List" to which the number of cells to which the broadcast information was successfully transmitted (for example, the Cell ID Broadcast) and the identification information (for example, the E-CGI) are set.

On the other hand, when the broadcast information is not successfully transmitted to any of the plurality of cells designated by the switching center MME, the transmission response transmitting unit 13 of the radio base station eNB is configured to transmit a "WRITE-REPLACE WARNING FAILURE message (a second transmission response)" which includes no information element "Broadcast Completed Area List".

The transmission response receiving unit 23 of the switching center MME is configured to detect occurrence of a failure in the radio base station eNB, when the transmission response receiving unit 23 received the "WRITE-REPLACE WARNING FAILURE message".

According to the mobile communication system according to the second modification, when the broadcast information was not successfully transmitted to any of the plurality of cells, the radio base station eNB transmits the "WRITE-REPLACE WARNING FAILURE message" which includes no information element "Broadcast Completed Area List" to the switching center MME, whereby the radio base station eNB can report, to the switching center MME, the unsuccessful transmission of the emergency information to any of the cells designated by the switching center MME.

The aspects of the present embodiment described above may be expressed in the following manner.

A first aspect of the present embodiment is summarized as a mobile communication method including the steps of: (A) transmitting, from a radio base station eNB to a plurality of cells designated by an information element "Warning Area List" included in a "WRITE-REPLACE WARNING REQUEST message (a transmission request)" received from a switching center MME, broadcast information; (B) transmitting, from the radio base station eNB to the switching center MME, a "WRITE-REPLACE WARNING RESPONSE message (a transmission response)" which includes an information element "Broadcast Completed Area List" to which the number of cells (for example, a Cell ID Broadcast) , and identification information of the cells (for example, an E-CGI) are set, in accordance with the "WRITE-REPLACE WARNING REQUEST message"; and (C) receiving, at the switching center MME, the "WRITE-REPLACE WARNING RESPONSE message"; wherein, in the step (B), when the broadcast information was successfully transmitted to at least one of a plurality of cells, the radio base station eNB sets the number of cells to which the broadcast information was successfully transmitted and identification information of the cells, as the number of cells (for example, the Cell ID Broadcast) and the identification information of the cells (for example, the E-CGI) in the information element "Broadcast Completed Area List"; in the step (B), when the broadcast information was not successfully transmitted to any of the plurality of cells, the radio base station eNB sets "0" to the number of cells (for example, the Cell ID Broadcast) in the information element "Broadcast Completed Area List"; and in the step (C), the switching center MME detects occurrence of a failure in the radio base station eNB, when "0" is set to the number of cells (for example, the Cell ID Broadcast) in the information element "Broadcast Completed Area List" included in the "WRITE-REPLACE WARNING RESPONSE message".

In the first aspect of the present embodiment, in the step (B), the radio base station eNB may set a "Cause (a cause of a failure)" to an information element "Broadcast Completed Area List", when the broadcast information was not successfully transmitted to any of the plurality of cells; and in the step (C), the switching center MME may perform a process corresponding to the "Cause" set to the information element "Broadcast Completed Area List" included in the "WRITE-REPLACE WARNING RESPONSE message".

A second aspect of the present embodiment is summarized as a mobile communication method including the steps of: (A) transmitting, from a radio base station eNB to a plurality of cells designated by an information element "Warning Area List" included in a "WRITE-REPLACE WARNING REQUEST message" received from a switching center MME, broadcast information; (B) transmitting, from the radio base station eNB to the switching center MME, a "WRITE-REPLACE WARNING RESPONSE message" which includes an information element "Broadcast Completed Area List" to which the number of cells (for example, a Cell ID Broadcast) and identification information of the cells (for example, an E-CGI) are set, in accordance with the "WRITE-REPLACE WARNING REQUEST message"; and (C) receiving, at the switching center MME, the "WRITE-REPLACE WARNING RESPONSE message"; wherein, in the step (B), when the broadcast information was successfully transmitted to at least one of the plurality of cells, the radio base station eNB sets the number of cells to which the broadcast information was successfully transmitted and the identification information, as the number of cells (for example, the Cell ID Broadcast) and the identification information of the cells (for example, the E-CGI) in the information element "Broadcast Completed Area List"; in the step (B), when the broadcast information was not successfully transmitted to any of the plurality of cells, the radio base station eNB transmits the "WRITE-REPLACE WARNING RESPONSE message" which includes no information element "Broadcast Completed Area List"; and in the step (C), when the switching center MME receives the "WRITE-REPLACE WARNING RESPONSE message" which includes no information element "Broadcast Completed Area List", the switching center MME detects occurrence of a failure in the radio base station eNB.

A third aspect of the present embodiment is summarized as a mobile communication method including the steps of: (A) transmitting, from a radio base station eNB to a plurality of cells designated by an information element "Warning Area List" included in a "WRITE-REPLACE WARNING REQUEST message" received from a switching center MME, broadcast information; (B) transmitting, from the radio base station eNB to a "WRITE-REPLACE WARNING RESPONSE message" in accordance with the "WRITE-REPLACE WARNING REQUEST message"; and (C) receiving, at the switching center MME, the "WRITE-REPLACE WARNING RESPONSE message"; wherein, in the step (B), when the broadcast information was successfully transmitted to at least one of the plurality of cells, the radio base station eNB transmits a "WRITE-REPLACE WARNING RESPONSE message (a first transmission response)" which includes an information element "Broadcast Completed Area List" to which the number of cells to which the broadcast information was transmitted successfully (for example, the Cell ID Broadcast) and the identification information of the cells (for example, the E-CGI) are set; in the step (B), when the broadcast information was not successfully transmitted to any of the plurality of cells, the radio base station eNB transmits a "WRITE-REPLACE WARNING FAILURE message (a second transmission response)" which includes no information element "Broadcast Completed Area List"; and in the step (C), when the switching center MME receives the "WRITE-REPLACE WARNING FAILURE message", the switching center MME detects occurrence of a failure in the radio base station eNB.

A fourth aspect of the present embodiment is summarized as a radio base station eNB which includes: a broadcast information transmitting unit 12 configured to transmit broadcast information to a plurality of cells designated by an information element "Warning Area List" included in a "WRITE-REPLACE WARNING REQUEST message" received from a switching center MME; and a transmission response transmitting unit 13 configured to transmit, to the switching center MME, a "WRITE-REPLACE WARNING RESPONSE message" which includes an information element "Broadcast Completed Area List" to which the number of cells (for example, a Cell ID Broadcast) and identification information of the cells (for example, an E-CGI) are set, in accordance with the "WRITE-REPLACE WARNING REQUEST message"; wherein, when the broadcast information was successfully transmitted to at least one of the plurality of cells, the transmission response transmitting unit 13 is configured to set the number of cells to which the broadcast information was successfully transmitted and the identification information of the cells, as the number of cells (for example, the Cell ID Broadcast) and the identification information of the cells (for example, the E-CGI) in the information element "Broadcast Completed Area List"; and when the broadcast information was not successfully transmitted to any of the plurality of cells, the transmission response transmitting unit 13 is configured to set "0" to the number of cells (for example, the Cell ID Broadcast) in the information element "Broadcast Completed Area List".

In the fourth aspect of the present embodiment, the transmission response transmitting unit 13 may be configured to set a "Cause (a cause of a failure)" in the information element "Broadcast Completed Area List", when the broadcast information was not successfully transmitted to any of the plurality of cells.

A fifth aspect of the present embodiment is summarized as a radio base station eNB which includes: a broadcast information transmitting unit 12 configured to transmit broadcast information to a plurality of cells designated by an information element "Warning Area List" included in a "WRITE-REPLACE WARNING REQUEST message" received from a switching center MME; and a transmission response transmitting unit 13 configured to transmit, to the switching center MME, a "WRITE-REPLACE WARNING RESPONSE message" which includes an information element "Broadcast Completed Area List" to which the number of cells (for example, a Cell ID Broadcast) and identification information of the cells (for example, an E-CGI) are set, in accordance with the "WRITE-REPLACE WARNING REQUEST message"; wherein: when the broadcast information was successfully transmitted to at least one of the plurality of cells, the transmission response transmitting unit 13 is configured to set the number of cells to which the broadcast information was successfully transmitted and the identification information of the cells, as the number of cells (for example, the Cell ID Broadcast) and the identification information of the cells (for example, the E-CGI) in the information element "Broadcast Completed Area List"; and when the broadcast information was not successfully transmitted to any of the plurality of cells, the transmission response transmitting unit 13 is configured to transmit the "WRITE-REPLACE WARNING RESPONSE message" which includes no information element "Broadcast Completed Area List".

A sixth aspect of the present embodiment is summarized as a radio base station eNB which includes: a broadcast information transmitting unit 12 configured to transmit broadcast information to a plurality of cells designated by an information element "Warning Area List" included in a "WRITE-REPLACE WARNING REQUEST message" received from a switching center MME; and a transmission response transmitting unit 13 configured to transmit a "WRITE-REPLACE WARNING RESPONSE message" to the switching center MME in accordance with the "WRITE-REPLACE WARNING REQUEST message"; wherein, when the broadcast information was successfully transmitted to at least one of the plurality of cells, the transmission response transmitting unit 13 is configured to transmit the "WRITE-REPLACE WARNING RESPONSE message (a first transmission response)" which includes an information element "Broadcast Completed Area List" to which the number of cells to which the broadcast information was transmitted successfully (for example, the Cell ID Broadcast) and the identification information of the cells (for example, the E-CGI) are set; and when the broadcast information was not successfully transmitted to any of the plurality of cells, the transmission response transmitting unit 13 is configured to transmit a "WRITE-REPLACE WARNING FAILURE message (a second transmission response)" which includes no information element "Broadcast Completed Area List".

The operation of the above-described radio base station eNB, the mobile station UE or the switching center MME may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the radio base station eNB, the mobile station UE or the switching center MME. As a discrete component, such a storing medium and processor may be arranged in the radio base station eNB, the mobile station UE or the switching center MME.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile communication method comprising the steps of:
   (A) transmitting, from a radio base station to a plurality of cells designated by a transmission request received from a switching center, broadcast information;
   (B) transmitting, from the radio base station to the switching center, a transmission response which includes an information element to which a number of cells and identification information of the cells are set, in accordance with the transmission request; and
   (C) receiving, at the switching center, the transmission response; wherein, in the step (B), when the broadcast information is successfully transmitted to at least one of the plurality of cells, the radio base station sets a number of cells to which the broadcast information was successfully transmitted and identification information of the cells, as the number of cells and the identification information of the cells in the information element;
   in the step (B), when the broadcast information is not successfully transmitted to all the plurality of cells, the radio base station transmits a transmission response which does not include the information element; and
   in the step (C), when the switching center receives the transmission response which does not include the information element, the switching center detects occurrence of a failure in the radio base station.

2. A radio base station comprising:
   a broadcast information transmitting unit configured to transmit broadcast information to a plurality of cells designated by a transmission request received from a switching center; and
   a transmission response transmitting unit configured to transmit, to the switching center, a transmission response which includes an information element to which a number of cells and identification information of the cells are set, in accordance with the transmission request; wherein,
   when the broadcast information is successfully transmitted to at least one of the plurality of cells, the transmission response transmitting unit is configured to set a number of cells to which the broadcast information was successfully transmitted and identification information of the cells, as the number of the cells and the identification information of the cells in the information element; and
   when the broadcast information is not successfully transmitted to all of the plurality of cells, the transmission response transmitting unit is configured to transmit a transmission response which does not include the information element.

\* \* \* \* \*